United States Patent [19]

Perks

[11] Patent Number: 4,807,129
[45] Date of Patent: Feb. 21, 1989

[54] HELICOPTER ROTOR AND ENGINE CONTROL

[75] Inventor: Malcolm Perks, Hertfordshire, England

[73] Assignee: Rolls-Royce plc, London, England

[21] Appl. No.: 7,665

[22] Filed: Jan. 28, 1987

[30] Foreign Application Priority Data

Feb. 4, 1986 [GB] United Kingdom ................. 8602749

[51] Int. Cl.4 .............................................. G06F 15/16
[52] U.S. Cl. ............................... 364/424.01; 364/131; 244/17.13
[58] Field of Search ............... 364/424, 425, 434, 131, 364/132; 371/9, 68; 244/17.13, 17.11, 17.19

[56] References Cited

U.S. PATENT DOCUMENTS

| | | | |
|---|---|---|---|
| 4,206,891 | 6/1980 | Perez et al. | 244/17.13 |
| 4,207,168 | 5/1981 | Murphy et al. | 364/200 |
| 4,313,201 | 1/1982 | Fischer et al. | 371/68 |
| 4,347,997 | 9/1982 | Byham et al. | 244/17.19 |
| 4,488,236 | 12/1984 | Morrison et al. | 364/442 |
| 4,493,465 | 1/1985 | Howlett et al. | 244/17.13 |
| 4,504,905 | 3/1985 | Burrage | 364/200 |
| 4,590,549 | 5/1986 | Burrage et al. | 364/131 |
| 4,628,455 | 12/1986 | Skutecki | 364/434 |

Primary Examiner—Parshotam S. Lall
Assistant Examiner—Thomas G. Black
Attorney, Agent, or Firm—Parkhurst, Oliff & Berridge

[57] ABSTRACT

A Helicopter rotor and engine control apparatus in which the computers used to control the engines and the rotors are linked to exchange performance data and act together to improve the aircraft performance.

3 Claims, 2 Drawing Sheets

4,807,129

HELICOPTER ROTOR AND ENGINE CONTROL

BACKGROUND OF THE INVENTION

This invention relates to the control of gas turbine engines and helicopter rotors.

Generally, the helicopter has two primary control means, namely the pitch angle (angle of attack) of each main rotor blade and the pitch angle of the tail rotor assembly. The former effectively provides control over all vertical and lateral directions as well as forward and backward motion; the latter, apart from reacting the main rotor torque also provides control over the fuselage heading.

Concentrating on the main rotor control, each blade has an individual pitch angle set by the aircraft flying controls. If all blade angles are changed together, the aircraft will move up or down. If the blades at the rear are changed relative to those at the front, fore and aft motion of the helicopter is controlled. If the blades at one side are changed relative to those at the other, lateral motion is controlled.

The main rotor pitch control mechanism is clearly very complex, requiring high power servo actuators and sophisticated engineering. The pitch controls are positioned in accordance with the pilot demands, and he is provided with two cockpit levers for these basic control purposes. The levers are, the collective pitch lever, which moves the blades collectively to achieve up and down flight control, and the cyclic pitch lever which moves the blades cyclically during any one revolution of the rotor and thereby provides fore/aft/lateral control. The pilot also has some control over tail rotor pitch, via foot operated rudder pedals for aircraft yaw control.

The mixing together of pilot's inputs, to achieve a stable and predictable aircraft flight path, is a major helicopter design problem. The movements of each flying control interact with the others, so that, for example, a demand for a left turn can cause some loss of height without an equivalent collective pitch compensation.

Helicopters, such as the Westland Helicopters PLC Lynx, make an already difficult situation worse by adopting a rotor design configuration, with rigid or semi-rigid rotors which are all but unusable except with artificial stability augmentation systems. Even with these aids, such helicopters remain extremely difficult to fly, and pilots have to be trained to observe many limitations when attempting to maneuver such as, rates of change of collective pitch, turn rates, combinations of collective pitch and cyclic pitch, etc. This situation comes into focus with the new generation of light military helicopters which require not only a fast (agile) response from the aircraft but also a reduced pilot workload to fly them due to the role expected from the helicopter.

In order to overcome the above mentioned problems, a new generation automatic flying control system (AFCS) is being developed by a number of aircraft manufacturers. This system, known as Active Control Technology (ACT), is not the subject of this patent application and is therefore not described in detail herein; however, it is sufficient to say that any direct coupling of the pilot's controls to the rotor system is replaced by a ccmputerised arrangement of sensors, digital intelligence and electromechanical actuators. In time, it is expected that ACT will be capable of sensing the pilot's demands and determining the best way of meeting those demands while automatically taking into account the limitations that the pilot previously had to observe, thereby providing a carefree handling helicopter.

A further aspect of the control problem, outside the influence of ACT, is the rotor speed itself; the lift developed by each blade depends not only on its angle of attack but also its velocity relative to the air. Rotor speed control is therefore important in overall rotor performance and hence critical to aircraft performance and controlability.

Many modern helicopters use free turbine turboshaft engines to provide power to the rotor. In such helicopters, the rotor is directly driven from, and is therefore directly dependant upon, the speed of rotation of the free turbine. In order to control the speed of rotation of the rotor, it is common to provide a free turbine governing system. This system senses the speed changes resulting from movement of the rotor blades and responds by changing engine power to maintain free turbine (rotor) speed to within desired limits. The accuracy of the governing system is critical in maintaining the desired level of torque matching between engines in a multi-engine application. The response of the whole engine/governing system is critical in preventing excessive transient variations in rotor speed, and special means are required to ensure torsional stability. The interface between the rotor system and the engine/governing system is a complex one and has given rise to many problems.

These problems are centered-around the necessity for the helicopter manufacturer to delegate the responsibility for controlling the speed of the lift generating surfaces (the rotor) to the engine manufacturer, thereby only having an indirect influence on a prime aircraft performance parameter.

It is clear that, while both Active Control Technology and engine governing techniques offer a great improvement in the performance of a helicopter, neither is capable of achieving optimum control over the helicopter since each is lacking in at least one control aspect.

SUMMARY OF THE INVENTION

It is an object of the present invention to provide a control system for a helicopter which reduces and possibly eliminates the disadvantages of the above mentioned control techniques.

The present invention provides a control system for a helicopter having a main rotor, a tail rotor, an engine and a rotor gearbox, the control system comprising a set of pilot controls, an Active Control Computer and Engine Control Computer, a main rotor actuator and a tail rotor actuator, in which:

the Active Control Computer is linked to receive data from the pilot's controls;

the main rotor actuator and tail rotor actuator are linked to exchange data with the Active Control Computer;

the main rotor actuator and tail rotor actuator act on their respective rotors to influence the pitch of the rotor blades;

the engine is linked to exchange data with the Engine Control Computer and linked to drive the rotor gearbox;

the rotor gearbox is linked to drive both the main and the tail rotor; and the Active Control Computer is linked to exchange data with the Engine Control Computer.

BRIEF DESCRIPTION OF THE DRAWINGS

The present invention will now be described with reference to the accompanying drawings in which.

DESCRIPTION OF THE PREFERRED EMBODIMENTS

Figure 1:
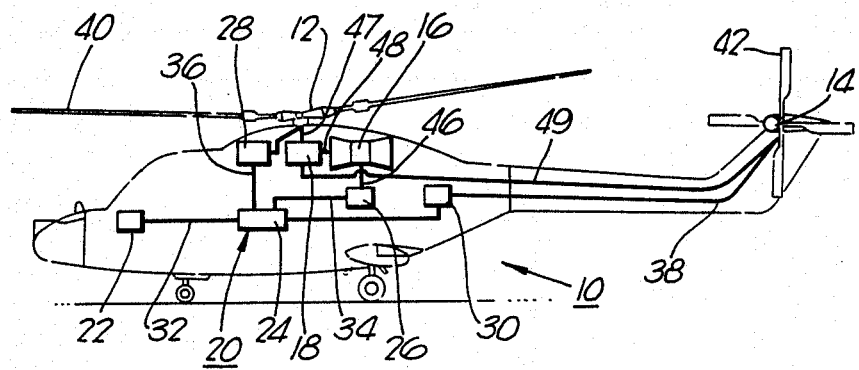
FIG. 1 is a pictorial representation of a helicopter incorporating the present invention.

Referring to FIG. 1, there is shown a helicopter 10 having a main rotor 12, a tail rotor 14, an engine 16, a main rotor gearbox 18 and control system 20. The control system 20 comprises the pilot's flying controls, shown diagrammatically by control box 22, an active control computer 24 (ACC), an engine control computer 26 (ECC), a main rotor actuator 28 and a tail rotor actuator 30. The active control computer 24 is linked to receive data from the pilot's controls 22 and exchange data with the engine control computer 26, via data transmission lines 32 and 34 respectively. The main rotor actuator 28 and tail rotor actuator 30 are linked to exchange data with the active control computer 24 along data transmission lines 36 and 38 respectively. The main rotor actuator 28 and the tail rotor actuator 30 act on their respective rotors to influence the pitch of the rotor blades 40, 42. The engine 16 is linked to exchange data with the engine control computer 26 along data line 46 and linked to supply torque to the main rotor gearbox 18 via transmission line 48. The main rotor gearbox 18 supplies torque to both the main rotor 12 and the tail rotor 14 via transmission shafts 47 and 49 respectively.

Figure 2:
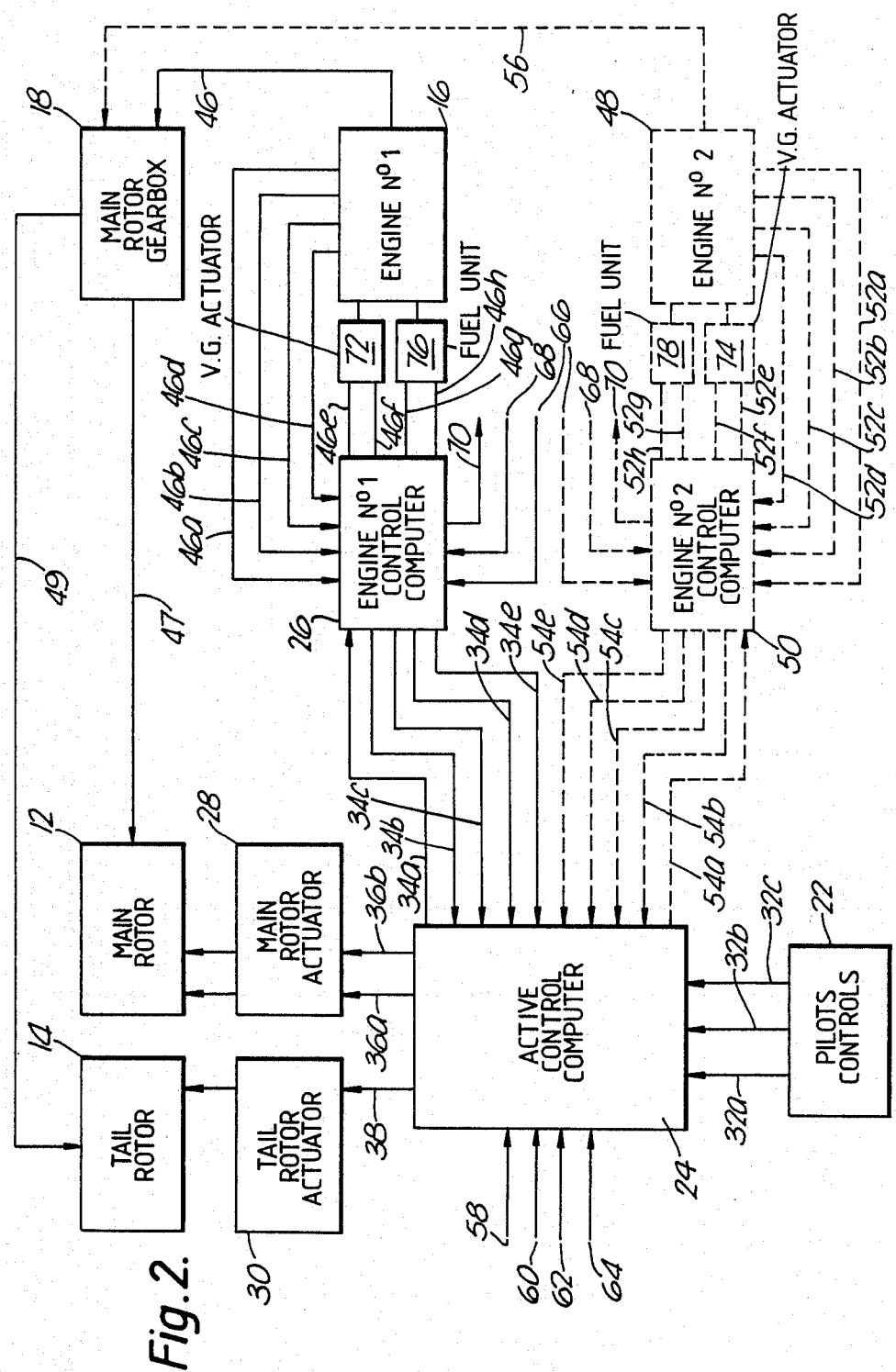
FIG. 2 illustrates in more detail the control system shown in FIG. 1.

Turning now to FIG. 2, which illustrates the control system and its interaction with the aircraft in more detail, it will be appreciated that if a second engine 48 is to be used then it is necessary to provide second engine control computer 50 which is linked to exchange data with the engine 48 and the active control computer 24 along data lines 52 and 54 respectively. The torque produced by the second engine 48 is supplied to the main rotor gearbox 18 via transmission line 56.

Further inputs to the active control computer, 24, not shown in FIG. 1, include rotor speed 58 and inputs from airframe sensors including main rotor collective pitch 60, cyclic pitch 62 and tail rotor pitch 64.

The pilot has two further modes of influence over the engine's control computers 26, 50, namely, engine discretes 66 and engine conditions 68. Engine discretes 66 are on/off type signals, used as a control input to activate some desired control response such as, for example, a switch to initiate a ramp in a control variable such as a speed datum. Engine condition control 68 is used to select certain operational conditions such as start, ground idle, or flight for example. Each of these conditions require a differing amount of control over various engine limitations. Each engine control computer 26, 50 provides data to the pilot, or alternatively a maintenance computer (not shown), along channel 70. Such a channel could be used, for example, to inform the pilot of any failure of a system or wherever present engine operating limits are exceeded. Each engine is provided with a variable geometry actuator 72, 74, each of which is controlled by its respective engine control computer 26, 50 via data lines 46e, 46f or 52e, 52f. Each actuator 72, 74 acts on the engine to change the geometry of said engine's variable inlet guide vanes (not shown) and/or the engine's intake area (also not shown), in response to a prompt from its associated Engine Control Computer 26, 50 (ECC). Each engine 16, 48 is further provided with a fuel control unit 74, 76, each of which is controlled by its respective ECC 26, 50 via data lines 46g, 46h or 52g, 52h. Each fuel control unit 74, 76 acts on the engine to control the fuel flow into said engine in response to a prompt from its associated ECC 26, 50, respectively.

Before describing in detail the operation of the control system as a whole, it is necessary to detail what further data is passed between the engines 16, 48 and their respective ECC's 26, 50, and between the ECC's 26, 50 and the active control computer 24 (ACC).

The data lines between the engines 16 and 48 and their respective ECC's 26, 50, not previously described in detail, are 46a, 46b, 46c, 46d, 52a, 52b, 52c and 52d, respectively. Lines 46a and 52a ECC's 26, 50, lines 46b and 52b transmit temperature data, lines 46c and 52c transmit data relating to the free turbine speed, while lines 46d and 52d transmit data relating to the torque produced by their respective engine 16, 48. It will be appreciated that other data, not specified herein could be added to further enhance the performance of the control system.

The data lines between the engine control computers 26, 50 and the active control computer, also not previously described in detail, are 34a, 34b, 34c, 34d, 34e, 54a, 54b, 54c, 54d and 54e, respectively. Lines 34a and 54a are used to inform the ECC's 26, 50 what torque is required from each engine, lines 34b, 54b transmit the amount of torque achieved by the respective engine 16, 48 to the active control computer 24, lines 34c, 54c are used to inform the ACC 24 of the rate at which the torque produced by the engines 16, 48 is being increased to meet the demand placed on it by the ACC 24. Lines 34d and 54d are used to inform the ACC 24 of the maximum torque available (Tmax) from each engine 16, 48. Lines 34e and, 54e are used to inform the ACC 24 of the engines status, and may also be used to transmit any further data not specified above.

In operation, the pilot demands a change in the cyclic and/or collective pitch of the main rotor 12 and/or the collective pitch of the tail rotor 14 by altering the position of the pilot controls 22 in proportion to the change required. The degree of change is transmitted to the Active Control Computer 24 along data lines 32a, 32b and 32c, respectively. The ACC 24 responds to these signals by placing a demand for torque (Tr) on the engines 16, 48 via lines 34a and 54a, and by signaling the main rotor and tail rotor actuators 28, 30 via lines 36a, 36b and 38, respectively, to initiate movement of the respective rotors 12, 14.

Excessive variations in rotor speed (transient droop), caused by applying an excessive load on the rotor for the available torque, can be avoided by programming the ACC 24 to move the rotors 12,14 only in proportion to the available torque. In order to achieve this function it is necessary to supply data relating to the torque achieved (Ta) by each engine 16, 48 to the ACC 24. Data lines 34b, 54b are provided for this purpose. Further data relating to the rate of change in the torque available from each engine (Tr-Ta) is used to determine the rate of change of the rotor pitch angles. The maximum torque available (Tmax) is also taken into consideration by the ACC 24 for control purposes.

I claim:

1. A control system for a helicopter having a main rotor, a torque reaction device such as a tail rotor, an engine and a rotor gearbox, the control system comprising a set of pilot controls, an Active Control Computer and Engine Control Computer, a main rotor actuator and a tail rotor actuator, in which:

the Active Control Computer is linked to receive data from the pilot's controls:

the main rotor actuator and tail rotor actuator are linked to exchange data with the Active Control Computer;

the main rotor actuator and tail rotor actuator act on their respective rotors to control the pitch of the rotor blades;

the engine is linked to exchange data with the Engine Control Computer and linked to drive the rotor gearbox the rotor gearbox is linked to drive both the main rotor and the tail rotor; and the Active Control Computer is linked to exchange data with the Engine Control Computer.

2. A control system for a helicopter according to claim 1 in which the Active Control Computer informs the Engine Control Computer what torque is required from said engine, and said Engine Control Computer informs said Active Control Computer of the torque being produced by said engine, the rate of change of said torque and the maximum torque available.

3. A control system for a helicopter according to claim 2 in which the Active Control Computer initiates control of the main rotor and the tail rotor to move said rotors only in proportion to the available torque.

* * * * *

UNITED STATES PATENT AND TRADEMARK OFFICE
CERTIFICATE OF CORRECTION

PATENT NO. : 4,807,129
DATED : February 21, 1989
INVENTOR(S) : M. P. PERKS

It is certified that error appears in the above-identified patent and that said Letters Patent is hereby corrected as shown below:

Column 1, lines 43-36, delete ", such as the Westland Helicopters PLC Lynx, make an already difficult situation worse by adopting a rotor design configuration, with rigid or semi-rigid rotors which are all but unusable except with";

line 47, before "artificial" insert --designed for high agility often incorporate--;

line 48, delete "extremely";

line 50, delete "when attempting to maneuver";

line 52, after "etc." insert --, when attempting to maneuver.--.

Signed and Sealed this

Eighteenth Day of September, 1990

*Attest:*

HARRY F. MANBECK, JR.

*Attesting Officer*  *Commissioner of Patents and Trademarks*